United States Patent
Althukair

(10) Patent No.: US 10,494,454 B2
(45) Date of Patent: Dec. 3, 2019

(54) PROCESS FOR TRANSITIONING BETWEEN INCOMPATIBLE CATALYSTS

(71) Applicant: SABIC Global Technologies, B.V., Bergen op Zoom (NL)

(72) Inventor: Mohammed Althukair, Riyadh (SA)

(73) Assignee: SABIC GLOBAL TECHNOLOGIES B.V., Bergen OP Zoom (NL)

( * ) Notice: Subject to any disclaimer, the term of this patent is extended or adjusted under 35 U.S.C. 154(b) by 22 days.

(21) Appl. No.: 15/560,785

(22) PCT Filed: Mar. 24, 2016

(86) PCT No.: PCT/EP2016/056605
§ 371 (c)(1),
(2) Date: Sep. 22, 2017

(87) PCT Pub. No.: WO2016/151098
PCT Pub. Date: Sep. 29, 2016

(65) Prior Publication Data
US 2018/0051102 A1    Feb. 22, 2018

Related U.S. Application Data

(60) Provisional application No. 62/308,497, filed on Mar. 15, 2016.

(30) Foreign Application Priority Data

Mar. 24, 2015 (EP) ................... 15160536

(51) Int. Cl.
| | |
|---|---|
| C08F 2/42 | (2006.01) |
| C08F 2/34 | (2006.01) |
| C08F 4/02 | (2006.01) |
| C08F 4/22 | (2006.01) |
| C08F 210/16 | (2006.01) |
| B01J 8/24 | (2006.01) |
| C08F 4/659 | (2006.01) |
| C08F 4/6192 | (2006.01) |

(52) U.S. Cl.
CPC .................. *C08F 2/42* (2013.01); *B01J 8/24* (2013.01); *C08F 2/34* (2013.01); *C08F 4/022* (2013.01); *C08F 4/22* (2013.01); *C08F 210/16* (2013.01); *C08F 4/6192* (2013.01); *C08F 4/65912* (2013.01); *C08F 4/65916* (2013.01); *C08F 2410/01* (2013.01); *C08F 2410/05* (2013.01)

(58) Field of Classification Search
None
See application file for complete search history.

(56) References Cited

U.S. PATENT DOCUMENTS

| | | |
|---|---|---|
| 3,450,183 A | 6/1969 | Hinton |
| 3,594,356 A | 7/1971 | Hinton |
| 3,687,920 A | 8/1972 | Johnson |
| 3,709,853 A | 1/1973 | Karapinka |
| 3,790,036 A | 2/1974 | Miller |
| 4,003,712 A | 1/1977 | Miller |
| 4,011,382 A | 3/1977 | Levine et al. |
| 4,086,408 A | 4/1978 | Karol et al. |
| 4,101,445 A | 7/1978 | Levine et al. |
| 4,179,399 A | 12/1979 | Lichtenberger et al. |
| 4,188,793 A | 2/1980 | Watson |
| 4,302,566 A | 11/1981 | Karol et al. |
| 4,372,758 A | 2/1983 | Bobst et al. |
| 4,376,191 A | 3/1983 | Geck |
| 4,460,755 A | 7/1984 | Williams et al. |
| 4,482,687 A | 11/1984 | Noshay et al. |
| 4,543,399 A | 9/1985 | Jenkins, III et al. |
| 4,560,671 A | 12/1985 | Gross et al. |

(Continued)

FOREIGN PATENT DOCUMENTS

| | | | |
|---|---|---|---|
| EP | 0596111 A1 | 5/1994 | |
| EP | 1059300 A1 * | 12/2000 | ............. C07C 1/321 |

(Continued)

OTHER PUBLICATIONS

IJpeij et al., "A Suzuki Coupling Based Route to 2,2'-Bis(2-indenyl)biphenyl Derivatives," J. Org. CHem. 2002, 67, 169-176.
International Search Report for international Application No. PCT/EP2016/056605; International Filing Date: Mar. 24, 2016; dated Jun. 29, 2016; 5 Pages.
Machine Translation of JPS4917426; Date of Publication: Apr. 30, 1974; 9 Pages.
Wild et al., "Determination of Branching Distributions in Polyethylene and Ethylene Copolymers," Journal of Polymer Science: Polymer Physics Edition, vol. 20, 441-455 (1982).

(Continued)

*Primary Examiner* — Catherine S Branch
(74) *Attorney, Agent, or Firm* — Cantor Colburn LLP

(57) ABSTRACT

The invention relates to a process for transitioning from a first continuous polymerization reaction in a reactor, for example a gas-phase reactor conducted in the presence of a first catalyst to a second continuous polymerization reaction in the reactor conducted in the presence of a second catalyst, wherein the first and second catalysts are incompatible, the process comprising: (a) discontinuing the introduction of the first catalyst from a catalyst feeding system into a reactor and emptying the catalyst feeding system of the first catalyst; (b) introducing a first catalyst killer to the reactor to substantially deactivate the first catalyst in the reactor; (c) introducing a second catalyst killer to the catalyst feeding system to substantially deactivate the first catalyst in the catalyst feeding system; (d) introducing a second catalyst to the catalyst feeding system and (e) introducing the second catalyst to the reactor from the catalyst feeding system, wherein the second catalyst killer is the same as or different from the first catalyst killer.

20 Claims, No Drawings

(56) References Cited

U.S. PATENT DOCUMENTS

| | | | |
|---|---|---|---|
| 4,588,790 A | 5/1986 | Jenkins, III et al. | |
| 4,610,574 A | 9/1986 | Peters | |
| 4,719,193 A | 1/1988 | Levine et al. | |
| 4,727,723 A | 3/1988 | Durr | |
| 4,755,495 A | 7/1988 | Cann et al. | |
| 4,774,299 A | 9/1988 | Dumain et al. | |
| 4,798,081 A | 1/1989 | Hazlitt et al. | |
| 4,882,400 A | 11/1989 | Dumain et al. | |
| 5,019,633 A | 5/1991 | Wagner et al. | |
| 5,035,732 A | 7/1991 | McCue, Jr. | |
| 5,070,055 A | 12/1991 | Schramm et al. | |
| 5,195,654 A | 3/1993 | Takakarhu et al. | |
| 5,202,396 A | 4/1993 | Kubo et al. | |
| 5,209,607 A | 5/1993 | Wei et al. | |
| 5,352,749 A | 10/1994 | Dechellis et al. | |
| 5,391,656 A | 2/1995 | Campbell et al. | |
| 5,421,167 A | 6/1995 | Verma | |
| 5,442,019 A | 8/1995 | Agapiou et al. | |
| 5,497,626 A | 3/1996 | Howard et al. | |
| 5,541,270 A | 7/1996 | Chinh et al. | |
| 5,626,034 A | 5/1997 | Manley et al. | |
| 5,672,665 A | 9/1997 | Agapiou et al. | |
| 5,672,666 A | 9/1997 | Muhle et al. | |
| 5,738,249 A | 4/1998 | Kikuchi et al. | |
| 5,741,350 A | 4/1998 | Rowles et al. | |
| 5,747,612 A | 5/1998 | Agapiou et al. | |
| 5,753,786 A | 5/1998 | Agapiou et al. | |
| 5,769,927 A | 6/1998 | Gottschlich et al. | |
| 5,962,606 A | 10/1999 | Williams et al. | |
| 5,979,177 A | 11/1999 | Sumner et al. | |
| 6,284,849 B1 * | 9/2001 | Almquist | C08F 10/00 502/152 |
| 6,560,989 B1 | 5/2003 | Roberts et al. | |
| 6,576,043 B2 | 6/2003 | Zwilling et al. | |
| 6,576,805 B2 | 6/2003 | Keady et al. | |
| 6,706,857 B2 | 3/2004 | Golden et al. | |
| 6,712,880 B2 | 3/2004 | Foglietta et al. | |
| 6,858,664 B2 | 2/2005 | Burdett et al. | |
| 6,949,612 B2 | 9/2005 | Agapiou et al. | |
| 7,122,607 B2 | 10/2006 | Hagerty et al. | |
| 7,128,827 B2 | 10/2006 | Tallman et al. | |
| 7,300,987 B2 | 11/2007 | Hagerty et al. | |
| 9,611,342 B2 | 4/2017 | Banat et al. | |
| 2001/0020072 A1 | 9/2001 | Agapiou et al. | |
| 2004/0214969 A1 * | 10/2004 | Ehrman | C08F 10/00 526/84 |
| 2005/0059784 A1 | 3/2005 | Schreck et al. | |
| 2005/0159122 A1 | 7/2005 | Mayer | |
| 2005/0229634 A1 | 10/2005 | Huebel et al. | |
| 2005/0267269 A1 | 12/2005 | Hagerty et al. | |
| 2006/0160965 A1 | 7/2006 | Goode et al. | |
| 2007/0004878 A1 | 1/2007 | Hagerty et al. | |
| 2013/0245218 A1 * | 9/2013 | Moman | C08F 10/02 526/183 |

FOREIGN PATENT DOCUMENTS

| | | |
|---|---|---|
| EP | 1731535 A1 | 12/2006 |
| EP | 2216347 A1 | 8/2010 |
| EP | 2610269 A1 | 7/2013 |
| JP | S4917426 B1 | 4/1974 |
| JP | 2003064105 A | 3/2003 |
| JP | 2008162173 A | 7/2008 |
| WO | 9201722 A1 | 2/1992 |
| WO | 9837101 A1 | 8/1998 |
| WO | 2004060931 A1 | 7/2004 |
| WO | 2012069157 A1 | 5/2012 |
| WO | 2013186025 A1 | 12/2013 |
| WO | 2014095481 A1 | 6/2014 |
| WO | 2015078816 A1 | 6/2015 |
| WO | 2016102546 A1 | 6/2016 |

OTHER PUBLICATIONS

Written Opinion of the International Searching Authority for International Application No. PCT/EP2016/056605; International Filing Date: Mar. 24, 2016; dated Jun. 29, 2016; 4 Pages.

International Search Report; International Application No. PCT/EP2015/080943; International Filing Date: Dec. 2015; dated Apr. 21, 2016; 7 pages.

Written Opinon; International Application No. PCT/EP2015/080943; International Filing Date; Dec. 22, 2015; dated Apr. 21, 2016; 7 pages.

* cited by examiner

PROCESS FOR TRANSITIONING BETWEEN INCOMPATIBLE CATALYSTS

CROSS REFERENCE TO RELATED APPLICATIONS

This application is a 371 of International Application No. PCT/EP2016/056605, filed Mar. 24, 2016, which claims priority to United States Application Serial No. 62/308,497, filed Mar. 15, 2016 and European Patent Application No. 15160536.7, filed Mar. 24, 2015 which are incorporated herein by reference in their entirety.

This invention relates to a process for transitioning between incompatible polymerization catalyst systems.

It is frequently necessary to transition from one type of catalyst system producing polymers having certain properties and characteristics to another catalyst system capable of producing polymers of different chemical and/or physical attributes. Transitioning between similar Ziegler-Natta catalyst systems or compatible catalyst systems generally takes place easily. Compatible catalysts are those catalysts having similar kinetics of termination and insertion of monomer and co-monomer (s) and/or do not detrimentally interact with each other.

However, the process is typically complicated when the catalyst systems are incompatible or of different types. For example, when transitioning between two incompatible catalyst systems such as a Ziegler-Natta catalyst system and a metallocene catalyst system, it has been found that some of the components of the Ziegler-Natta catalyst system act as poisons to the metallocene catalyst system. Consequently, the components of the Ziegler-Natta catalyst system prevent the metallocene catalyst system from producing the polyolefin within the desired specifications. Further, the remains of the Ziegler-Natta catalyst system lead to 'gels' or defect areas in the articles made from the polymers produced by the contaminated metallocene catalyst system.

In the past, to accomplish an effective transition between incompatible catalysts, the first catalyzed olefin polymerization process was stopped by various techniques known in the art. The reactor was then emptied, recharged and a second catalyst system was introduced into the reactor. Such catalyst conversions are time consuming and costly because of the need for a reactor shut-down for an extended period of time during transition and the off-grade material. Further, the catalyst feeding system had to be physically cleaned for producing polyolefin within the desired specifications. This was done by disassembling the catalyst feeding system for physical cleaning, which is followed by reassembling, priming with the second catalyst, and then charging the catalyst feeding system with the second catalyst. This further makes the transition process time consuming and costly.

Another transitioning method involves injecting polymerization inhibitors or "catalyst killers" to the reactor to substantially terminate polymerization reactions within the reactor. The use of catalyst killing and/or deactivating agents in the reactor is disclosed in U.S. Pat. Nos. 5,442,019, 5,753,786, and 6,949,612 B2 to Agapiou et al., U.S. Pat. No. 5,672,666 to Muhle et al., and U.S. Pat. No. 6,858,684 B2 to Burdett et al.

There is still a need in the art for an efficient transitioning process which allows producing polyolefin which fulfills the required properties such as melt index and density, and which leads to articles substantially free from gels.

It is an objective of the invention to provide a process in which above-mentioned and/or other problems are solved.

Accordingly, the present invention provides a process for transitioning from a first continuous polymerization reaction in a reactor, for example a gas-phase reactor conducted in the presence of a first catalyst to a second continuous polymerization reaction in the reactor conducted in the presence of a second catalyst, wherein the first and second catalysts are incompatible, the process comprising:

(a) discontinuing the introduction of the first catalyst from a catalyst feeding system into a reactor and emptying the catalyst feeding system of the first catalyst;

(b) introducing a first catalyst killer to the reactor to substantially deactivate the first catalyst in the reactor;

(c) introducing a second catalyst killer to the catalyst feeding system to substantially deactivate the first catalyst in the catalyst feeding system;

(d) introducing a second catalyst to the catalyst feeding system and (e) introducing the second catalyst to the reactor from the catalyst feeding system, wherein the second catalyst killer is the same as or different from the first catalyst killer.

For the purposes of this patent specification and appended claims, the term "incompatible catalysts" are understood as those that satisfy one or more of the following: 1) those catalysts that in each other's presence reduce the productivity of at least one of the catalysts by greater than 50%; 2) those catalysts that under the same reactive conditions one of the catalysts produces polymers having a molecular weight (Mw) greater than two times higher than any other catalyst in the system; and 3) those catalysts that differ in comonomer incorporation or reactivity ratio under the same conditions by more than about 30%

Productivity is herein understood as kg of product per kg of catalyst over a certain period of time. Mw is herein understood as the weight average molecular weight as measured using SEC (Size Exclusion Chromatography using 1,2,4-trichlorobenzene as an eluent, and calibrated using linear polyethylene standards. The comonomer incorporation is measured by the analytical temperature rising elution fractionation (aTREF) conducted according to the method described in U.S. Pat. No. 4,798,081 and Wilde, L.; Ryle, T. R.; Knobeloch, D. C; Peat, L R. ; Determination of Branching Distributions in Polyethylene and Ethylene Copolymers, J. Polym. ScL, 20, 441-455 (1982), which are incorporated by reference herein in their entirety. The composition to be analyzed is dissolved in 1,2-dichlorobenzene of analytical quality filtrated via 0.2 µm filter and allowed to crystallize in a column containing an inert support (Column filled with 150 µm stainless steel beans (volume 2500 µL) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (1,2-dichlorobenzene) from 20 to 130° C. at a rate of 1° C./min.

The instrument used may be Polymer Char Crystaf-TREF 300.

Stabilizers: 1 g/L Topanol+1 g/L Irgafos 168
Sample: approx. 70 mg in 20 mL
Sample volume: 0.3 mL
Pump flow: 0.50 mL/min The software from the Polymer Char Crystaf-TREF-300 may be used to generate the spectra.

The present invention is based on the realization that the catalyst killer can also be used for the catalyst feeding system in addition to its use for the reactor, which allows the catalyst feeding system to be used without the time consuming physical cleaning of the catalyst feeding system while ensuring that desired polymer is obtained after the transitioning process.

A catalyst is fed from a catalyst feeding system comprising for example a catalyst supply vessel and an injection tube connected to the catalyst supply vessel and the reactor. The catalyst feeding system may optionally also comprise a pump. Another example of suitable catalyst feeding system can comprise a storage chamber, a metering device and an intermediate chamber, through which an inert carrier gas is released by a fast-opening valve to sweep the powder to the reactor (such a system is described for example in U.S. Pat. No. 4,774,299). A further example of suitable catalyst feeding system can use a compressed gas to deliver the catalyst (such a system is described for example in U.S. Pat. No. 3,790,036). Another example of suitable catalyst feeding system can work through for steps of subdividing, intercepting, exposing and flashing the catalyst by opening and closing of a catalyst feed line (such a system is described for example in JP 49-17426). Other examples of catalyst feeder systems are described in EP 0596111, EP 0961784, U.S. Pat. Nos. 4,610,574, 5,195,654, 5,209,607, 5,738,249 or WO 9201722. It was found that the use of the catalyst killer in the catalyst feeding system kills the trace amount of the first catalyst which cannot be removed by purging and which remains in the injection tube.

The polymerization catalysts used in the present invention are solid catalysts. The solid polymerization catalyst may be fed to the reactor as a solution or suspension in a solvent, for example a hydrocarbon solvent, in a slurry in a diluent, such as an alkane, for example isopentane or n-hexane or the like, or in an inert gas, such as nitrogen (dry catalyst). The first catalyst and the second catalyst are of the same type, i.e. the catalyst feeding system is typically arranged for use with one of a solution or suspension in a solvent or a slurry in a diluent; catalyst in an inert gas (dry catalyst). When the first catalyst is fed as a solution, suspension or slurry, the second catalyst is also fed as a solution, suspension or slurry, respectively. Similarly, when the first catalyst is fed as catalyst in an inert gas, the second catalyst is also fed as catalyst in an inert gas.

The deactivation of the catalyst remaining in the reactor has previously been studied in detail. Examples of these studies are found in U.S. Pat. No. 6,949,612, US 20050059784, WO 2004060931, U.S. Pat. Nos. 5,747,612, 5,442,019, 5,672,665, 5753786. None of these prior art documents mentions the effect of the trace amount of incompatible catalyst and the possibility of the first active catalyst remaining in the catalyst feeding system even after intensive purging.

U.S. Pat. No. 5,672,666 describes a process for transitioning from a Ziegler-Natta catalyst to a metallocene catalyst in which a deactivating agent is introduced to the reactor and the reactor is purged before the introduction of the metallocene catalyst. U.S. Pat. No. 5,672,666 mentions that substantially all of the activating and/or scavenging compounds, for example TEAL, are removed prior to the introduction of the metallocene catalyst. U.S. Pat. No. 5,672,666 further mentions that it is important that if a common catalyst feeder system is used it needs to be substantially free of any residual catalyst.

The present inventor surprisingly found that using a common catalyst feeder system cleaned by purging can only lead to a system which is substantially free of the residual first catalyst and which is not satisfactory in terms of density, melt index and/or gel content. For transitioning to obtain polyolefin having also a desired low gel content, a catalyst feeder substantially free of residual catalyst achieved by purging is insufficient, but a catalyst feeder completely free of residual catalyst is required. Accordingly, the present invention provides introducing a catalyst killer in the catalyst feeding system to kill the first catalyst in order to ensure that no first catalyst remains in the catalyst feeding system. Subsequently a second catalyst is introduced to the reactor from the catalyst feeding system. U.S. Pat. No. 5,672,666 does not mention that the catalyst feeder may be made free of residual catalyst by introducing a catalyst killer to the catalyst feeder.

Therefore, maintenance does not need to be involved in cleaning the catalyst feeder (opening up of catalyst feeder) and the time for purging is reduced, allowing for a more effective use of the reactor (not necessary to hold the reactor for a long time).

For the purposes of this patent specification and appended claims the terms "catalysts" and "catalyst systems" are used interchangeably.

Polymerization

The first polymerization reaction and the second polymerization reaction may be a continuous polymerization of one or more α-olefin monomers of which at least one is ethylene or propylene. Preferred α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80% by weight, for example at least 90% by weight, for example at least 95% by weight, for example at least 98% by weight or for example 99% by weight based on the total copolymer.

With 'continuous polymerization of one or more α-olefins' or 'continuous preparation of polyolefin' is meant herein that one or more α-olefin monomers of which at least one is ethylene or propylene are fed to the reactor and polyolefin thus produced is (semi)-continuously withdrawn through a polymer discharge system connected to the reactor.

The continuous polymerization of one or more α-olefin monomers will produce polyolefins in the form of particles, herein also referred to as 'polyolefin'. Examples of polyolefins which may be produced include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene homopolymers and polypropylene copolymers, including random copolymers, and block or multi-block copolymer and ethylene propylene rubber (EPR). In some examples, the propylene random copolymer may contain up to 5 wt % of ethylene.

Preferably, in the process of the invention, the first polymerization and/or the second polymerization produces a polyethylene, more preferably a linear low density polyethylene or high density polyethylene; or a polypropylene homopolymer or a propylene random copolymer.

Fluidized Bed

The process of this invention can be used in any polymerization process, such as gas phase polymerization process, liquid phase polymerization process and solid phase polymerization process.

For example, the process of this invention can be used in any gas phase polymerization process in a gas phase reactor. The gas phase reactor may be any reactor suitable for gas phase polymerizations and may e.g. be vertically, horizontally mechanically agitated reactor or a fluidized bed reactor. A gas phase polymerization process in a fluidized bed reactor is preferred. In a typical continuous gas fluidized bed polymerization process for the production of polymer from monomer, a gaseous stream comprising monomer is passed through a fluidized bed reactor in the presence of a catalyst under reactive conditions.

Gas fluidized bed polymerization plants generally employ a continuous gas cycle. In one part of the cycle, in a reactor a cycling gas stream is heated by the heat of polymerization. This heat is mainly removed in another part of the cycle by a cooling system external to the reactor. In one embodiment the cycle gas stream is cooled to form a gas and a liquid phase mixture that is then introduced into the reactor. A polymer product is withdrawn from the reactor. For a detailed description of a gas phase process see U.S. Pat. Nos. 4,543,399 and 4,588,790 herein fully incorporated by reference Using a fluidized bed polymerization process substantially reduces the energy requirements as compared to other polymerization processes and most importantly reduces the capital investment required to run such a polymerization process. In preferred embodiments, the fluidized bed is maintained in a fluidized condition during the process of this invention.

There are many types of fluidized bed reactors, among which a bubbling fluidized bed reactor, a circulating fluidized bed reactor, an annular fluidized bed reactor, a multizone fluidized bed reactor and a flash reactor.

With 'fluidized bed' as used herein is meant that an amount of solid particles (in this case preferably the solid catalyst and/or the solid catalyst to which the monomer is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid.

An example of a process using a fluidized bed for producing polyolefins is disclosed in U.S. Pat. No. 4,882,400. Other examples of processes using a fluidized bed for producing polyolefins are described in, for example, U.S. Pat. Nos. 3,709,853; 4,003,712; 4,011,382; 4,302,566; 4,543,399; 4,882,400; 5,352,749; 5,541,270; 7,122,607, and 7,300,987. The bottom of a fluidized bed reactor (FBR) can for example comprise an inlet connected to a feeder for the reaction composition such as ethylene, nitrogen (N2), hydrogen (H2), comonomer, catalyst modifier. The middle zone in the reactor above the distribution plate comprises an inlet for the polymerization catalyst that can be fed to the reactor in combination with nitrogen (N2). The middle zone of the reactor also comprises an outlet to the product discharge tank. The top zone of the reactor comprises an outlet for a top recycle stream, wherein the outlet for the top recycle stream is connected to an inlet of the compressor. The compressor comprises an outlet for compressed fluids and the outlet of the compressor is connected to an inlet for compressed fluids of the cooling unit. The cooling unit comprises an outlet for providing a bottom recycle stream, which outlet of the cooling unit is connected to the inlet at the bottom of the reactor.

Catalysts

While in the preferred embodiment the process of the invention specifically addresses transitioning between a traditional Ziegler-Natta catalyst and a metallocene catalyst, it is within the scope of this invention that the process of the invention would apply to any transition between incompatible catalysts. For example, transitioning between a traditional Ziegler-Natta catalyst and a chromium catalyst or transitioning between a chromium catalyst and a metallocene catalyst or even transitioning between a traditional Ziegler-Natta titanium catalyst to a Ziegler-Natta vanadium catalyst. This invention contemplates that the direction of transitioning between incompatible catalysts is not limiting, however, it is preferred that the process of the invention transitions from any other catalyst incompatible with a metallocene catalyst.

Ziegler-Natta Catalyst

Traditional Ziegler-Natta catalysts typically in the art comprise a transition metal halide, such as titanium or vanadium halide, and an organometallic compound of a metal of Group 1, 2 or 3, typically trialkylaluminum compounds, which serve as an activator for the transition metal halide. Some Ziegler-Natta catalyst systems incorporate an internal electron donor which is complexed to the alkyl aluminum or the transition metal. The transition metal halide may be supported on a magnesium halide or complexed thereto. This active Ziegler-Natta catalyst may also be impregnated onto an inorganic support such as silica or alumina. For the purposes of this patent specification chromocene catalysts, for example, described in U.S. Pat. No. 4,460,755, which is incorporated herein by reference, are also considered to be traditional Ziegler-Natta catalysts. For more details on traditional Ziegler-Natta catalysts, see for example, U.S. Pat. Nos. 3,687,920, 4,086,408, 4,376,191, 5,019,633, 4,482,687. 4,101,445, 4,560,671, 4,719,193, 4,755,495, 5,070,055 all of which are herein incorporated by reference.

Preferably, Ziegler-Natta catalyst is a catalyst made by a process comprising the steps of:

i. contacting a dehydrated support having hydroxyl groups with a magnesium compound having the general formula $MgR^1R^2$, wherein $R^1$ and $R^2$ are the same or different and are independently selected from the group comprising an alkyl group, alkenyl group, alkadienyl group, aryl group, alkaryl group, alkenylaryl group and alkadienylaryl group;

ii. contacting the product obtained in step (i) with modifying compounds (I), (II) and (III), wherein:

(I) is at least one compound selected from the group consisting of carboxylic acid, carboxylic acid ester, ketone, acyl halide, aldehyde and alcohol;

(II) is a compound having the general formula $R^{11}{}_f(R^{12}O)_g SiX_h$, wherein f, g and h are each integers from 0 to 4 and the sum of f, g and h is equal to 4 with a proviso that when h is equal to 4 then modifying compound (I) is not an alcohol, Si is a silicon atom, O is an oxygen atom, X is a halide atom and $R^{11}$ and $R^{12}$ are the same or different and are independently selected from the group comprising an alkyl group, alkenyl group, alkadienyl group, aryl group, alkaryl group, alkenylaryl group and alkadienylaryl group;

(III) is a compound having the general formula $(R^{13}O)_4M$, wherein M is a titanium atom, a zirconium atom or a vanadium atom, O is an oxygen atom and $R^{13}$ is selected from the group comprising an alkyl group, alkenyl group, alkadienyl group, aryl group, alkaryl group, alkenylaryl group and alkadienylaryl group; and iii. contacting the product obtained in step (ii) with a titanium halide compound having the general formula $TiX_4$, wherein Ti is a titanium atom and X is a halide atom.

The details of such Ziegler-Natta catalyst are described in WO2012/069157, incorporated herein by reference.

Metallocene Catalyst

A metallocene catalyst is well-known. For example, E. G. Ijpeji et al., A Suzuki coupling based route to 2,2'-bis(2-indenyl)biphenyl derivatives, *J. Org. Chem.*, 2002, 67, 167 describe a number of processes for the preparation of bridged bis(indenyl) ligands.

The metallocene catalyst is preferably a metallocene catalyst of the general formula I below

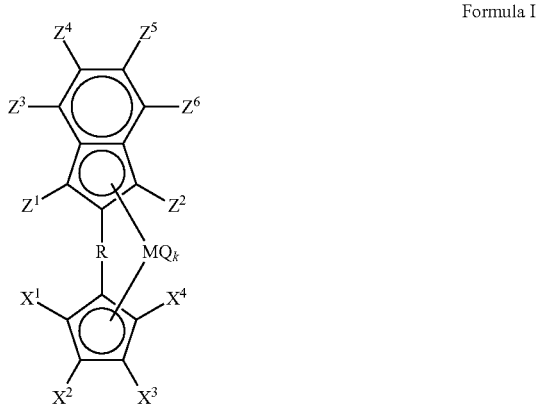

Formula I wherein:

M is a transition metal selected from the group consisting of lanthanides and metals from group 3, 4, 5 or 6 of the Periodic System of Elements; M is preferably selected from the group consisting of Ti, Zr and Hf with Zr being most preferred.

Q is an anionic ligand to M, k represents the number of anionic ligands Q and equals the valence of M minus two divided by the valence of the anionic Q ligand R is a hydrocarbon bridging group, such as alkyl. R preferably contains at least one sp2-hybridised carbon atom that is bonded to the indenyl group at the 2-position.

Z and X are substituents.

In another preferred embodiment the metallocene catalyst is of the general formula II below

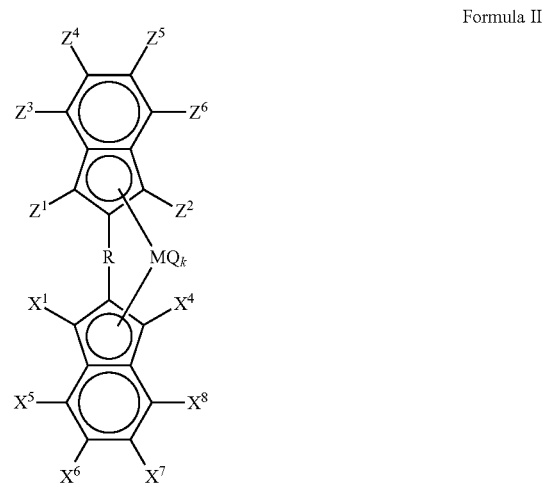

Formula II wherein:

M is a transition metal selected from the group consisting of lanthanides and metals from group 3, 4, 5 or 6 of the Periodic System of Elements; M is preferably selected from the group consisting of Ti, Zr and Hf with Zr being most preferred.

Q is an anionic ligand to M, k represents the number of anionic ligands Q and equals the valence of M minus two divided by the valence of the anionic Q ligand R is a hydrocarbon bridging group, such as alkyl. R preferably contains at least one sp2-hybridised carbon atom that is bonded to the indenyl group at the 2-position.

Z and X are substituents.

Bridging group R in the metallocene catalysts of general formula's I and II above preferably contains at least one aryl group. For example, the aryl group may be a monoaryl group such as phenylene or naphthalene or a biaryl group, such as biphenylidene or binaphthyl. Preferably the bridging group R stands for an aryl group, preferably R stands for a phenylene or biphenylidene group. The bridging group R is connected to the indenyl groups via a sp2 hybridised carbon atom, for example a phenylene group may be connected via the 1 and the 2 position, a biphenylene group may be connected via the 2 and 2'-position, a naphthalene group may be connected via the 2 and 3-position, a binapthyl group may be connected via the 2 and 2'-position. Preferably R stands for a phenylene group that is connected to the indenyl groups via the 1 and the 2 position. R may be 2,2'-biphenylene.

The substituents X in formulas I and II above may each separately be hydrogen or a hydrocarbon group with 1-20 carbon atoms (e.g. alkyl, aryl, aryl alkyl). Examples of alkyl groups are methyl, ethyl, propyl, butyl, hexyl and decyl. Examples of aryl groups are phenyl, mesityl, tolyl and cumenyl. Examples of aryl alkyl groups are benzyl, pentamethylbenzyl, xylyl, styryl and trityl. Examples of other substituents are halides, such as chloride, bromide, fluoride and iodide, methoxy, ethoxy and phenoxy. Also, two adjacent hydrocarbon radicals may be connected with each other in a ring system. X may also be a substituent which instead of or in addition to carbon and/or hydrogen may comprise one or more heteroatoms from group 14, 15 or 16 of the Periodic System of Elements. Examples of such a heteroatom containing substituents are alkylsulphides (like MeS-, PhS-, n-butyl-S-), amines (like Me2N-, n-butyl-N-), Si or B containing groups (like Me3Si- or Et2B-) or P-containing groups (like Me2P- or Ph2P-). Preferably the X substituents are hydrogen.

The substituents Z in formulas I and II above may each separately be a substituent as defined above for substituent X. Z1 and Z2 substituents can together with the X1 and X4 substituents form a second bridge that connects the indenyl group with the cyclopentadienyl group in the indenyl compound.

Examples of metallocene catalysts for use in the present invention are [ortho-bis(4-phenyl-2-indenyl)-benzene]zirconiumdichloride, [ortho-bis(5-phenyl-2-indenyl)-benzene]zirconiumdichloride, [ortho-bis(2-indenyl)benzene]zirconiumdichloride, [ortho-bis(2-indenyl)benzene]hafniumdichloride, [ortho-bis(1-methyl-2-indenyl)-benzene]zirconiumdichloride, [2,2'-(1.2-phenyldiyl)-1.1'-dimethylsilyl-bis(indene)]zirconiumdichloride, [2,2'-(1,2-phenyldiyl)-1,1'1-diphenylsilyl-bis(indene)]zirconiumdichloride, [2,2'-(1.2-phenyldiyl)-1.1'-(1.2-ethanediyl)-bis(indene)]zirconiumdichloride, [2.2'-bis(2-indenyl)biphenyl]zirconiumdichloride and [2,2'-bis(2-indenyl)biphenyl]hafniumdichloride.

The metallocene catalyst preferably contains zirconium as metal group M. The zirconium amount in the catalyst composition is preferably in the range of 0.02-1 wt %, preferably 0.15-0.30 wt % based on the catalyst composition.

The metallocene catalyst may be supported on a support, optionally with a catalyst activator and optionally a modifier. The second catalyst is preferably a metallocene catalyst composition comprising a support containing a metallocene catalyst, a catalyst activator and a modifier described in EP2610269, incorporated herein by reference. Such catalyst composition has an advantage that reactor fouling is reduced. It was observed that such catalyst composition was particularly sensitive to the gelling problem when common catalyst feeder was used.

The term "catalyst activator" as used herein is to be understood as any compound which can activate the single-site catalyst so that it is capable of polymerization of monomers, in particular olefins. Preferably the catalyst activator is an alumoxane, a perfluorophenylborane and/or a perfluorophenylborate, preferably alumoxane, more preferably methylaluminoxane and/or modified methylaluminoxane.

The support in the catalyst composition of the present invention can be an organic or inorganic material and is preferably porous. Examples of organic material are crosslinked or functionalized polystyrene, PVC, cross-linked polyethylene. Examples of inorganic material are silica, alumina, silica-alumina, inorganic chlorides such as $MgCl_2$, talc and zeolite. Mixtures of two or more of these supports may be used. The preferred particle size of the support is from 1 to 120 micrometres, preferably of from 20 to 80 micrometres and the preferred average particle size is from 40 to 50 micrometres. The preferred support is silica. The pore volume of the support is preferably of from 0.5 to 3 $cm^3/g$. The preferred surface area of the support material is in the range of from 50 to 500 $m^2/g$. The silica used in this invention is preferably dehydrated prior to being used to prepare the catalyst composition.

Chromium Catalyst

Chromium containing catalysts, or chromium catalysts, are well-known in the art. Preferred examples of chromium catalysts are chromium catalysts supported on silica. The catalyst may contain other metal compounds such as Ti, Mg, Al compounds.

An example of the chromium catalysts is a chromium oxide catalyst supported on silica, which is modified with a Ti alkoxide compound, for example titaniumbutoxide, and activated at a high temperature. Such chromium catalyst is described in detail in WO2013/186025, hereby incorporated by reference.

A further example of the chromium catalysts is a catalyst based on a silylchromate (for example bis triphenylsilyl chromate), which is absorbed on a silica carrier and activated with an aluminum allyl compound. Such chromium catalyst is described in detail in WO2014/095481, hereby incorporated by reference.

Step (a)

The discontinuation step may be done in various ways. An example of the discontinuation step is described in European patent application 14199685.0.

Subsequently, the catalyst feeding system is disconnected from the reactor and the catalyst feeding system is emptied of the first catalyst, i.e. the first catalyst is dumped from the catalyst feeding system. In step (a), not all of the first catalyst can be removed from the catalyst feeding system. The remaining first catalyst is deactivated in step (c) as described later.

Step (b)

In step (b), to substantially (preferably completely) terminate the polymerization reactions within the reactor, polymerization inhibitors or "catalyst killers", preferably comprising at least one irreversible catalyst killer, are employed. For the purposes of this patent specification, the catalyst killers do not include that minor portion of catalyst killers that may contaminate the monomer or comonomer feed streams during normal polymerization conditions (for example, internal olefins). The catalyst killer is introduced to substantially deactivate the first catalyst. The term 'substantially deactivate' is herein understood to mean that the catalyst productivity is decreased by at least 80%, preferably at least 90%. Preferably, the catalyst productivity is decreased by about 100%, i.e. the catalyst is completely deactivated.

Catalyst Killer

There are two general types of polymerization inhibitors. First, reversible catalyst killers which may be used in step (b) or step (c) of the process of the invention are those such as, but not limited to, for example, carbon monoxide (CO), carbon dioxide ($CO_2$), internal olefins, 2-butene and the like, internal dienes, 2-4 hexadiene and the like, alkenes and butadienes. Reversible catalyst killers typically initially inhibit catalyst activity and polymerization for a period of time, but, do not irreversibly deactivate the catalyst. In fact, after a period of time under normal polymerization conditions the catalysts reactivate and polymerization will continue. Two or more irreversible catalyst killers can also be used in combination.

These reversible catalyst killers can be used in any combination or order of introduction in the process of this invention.

Second, there are irreversible catalyst killers, those killers that irreversibly inactivate a catalyst's ability to polymerize olefins.

In some embodiments of the invention, one or more known irreversible catalyst killer can be used, e.g. oxygen, water ($H_2O$), alcohols, glycols, phenols, ethers, carbonyl compounds such as ketones, aldehydes, carboxylic acids, esters, fatty acids, alkynes such as acetylene, nitriles, nitrous compounds, pyridine, pyroles, carbonylsulfide (COS) and mercaptans. Amines such as cyclohexylamine may also be used as the irreversible catalyst killer.

These irreversible catalyst killers can be used in any combination or order of introduction in the process of this invention.

Preferably, cyclohexylamine is used as the irreversible catalyst killer in step b). In some embodiments of the invention, only cyclohexylamine is used as the irreversible catalyst killer. In other embodiments of the invention, cyclohexylamine is used in combination with a further reversible or irreversible catalyst killer.

It is not beyond the scope of this invention that a mixture of one or more of these reversible and irreversible catalyst killers can be combined before introduction into a reactor, however, one of ordinary skill in the art will recognize that some of these killers could react with each other and are thus better introduced separately.

The use of the reversible catalyst killer in step (b) decreases the likelihood of sheeting and/or fouling occurring in the reactor where the process of the invention takes place within the reactor in which polymerization was occurring with the first catalyst. The amount of reversible catalyst killer used depends on the size of the reactor and the quantity and type of catalysts and cocatalysts in the reactor. Preferably, the reversible catalyst killer of the invention can be used for example in an amount based on the total gram atoms of the catalyst transition metal components. However, where any activator or cocatalyst is used with the first catalyst, and such activator or cocatalyst is capable of reacting with the second catalyst, the reversible catalyst killer can be used for example in an amount based on the total gram atoms of catalyst transition metal components and any activator.

In some embodiments the reversible killer for the reactor is used in amount greater than 1 molar equivalent, preferably greater than 2 molar equivalents based on the total gram atoms transition metal of the catalyst in the reactor.

In some embodiments once the reversible catalyst killer has been introduced into the reactor, a period of time of about 5 minutes to 24 hours, preferably 1 to 12 hours, more preferably 1 to 6 hours and most preferably 1 to 2 hours passes before introducing an irreversible catalyst killer. Letting this time pass is meant by putting the reactor "on hold". The duration can depend on the nature and amount of catalyst and volume of the reactor. In a gas phase reactor there is a seed bed that is typically very large in size and quantity of polymer. Thus, a sufficient period of time is needed to allow the reversible catalyst killer to disperse throughout the reactor, particularly throughout any polymer product within the reactor.

In a preferred embodiment the amount of irreversible catalyst killer introduced into the reactor is in the range of 0.1 to 1000 molar ratio of irreversible catalyst killer to the total metal of the catalyst and any activator in the reactor, preferably 0.1 to 100, more preferably about 1 to about 10, even more preferably about 1 to about 5 and most preferably greater than about 1 to less than about 2. However, where any activator or cocatalyst is used with the first catalyst, and such activator or cocatalyst is capable of reacting with the second catalyst, the irreversible catalyst killer can be used in an amount based on the total gram atoms of catalyst transition metal components and any activator. In another embodiment, the irreversible catalyst killer can be used in an amount in the range of 100% to 125% of that necessary to fully inactivate all of the active first catalyst. This allows to substantially deactivate the first catalyst (so that it can also preferably not reactive itself) before introducing a second incompatible catalyst. This also allows to avoid an excess amount of irreversible killer that could remain in the reactor and partially or totally deactivate the second incompatible catalyst upon its injection into the reactor.

The amount of the irreversible catalyst killer to be added may be determined based on the measurement of the static of the reactor.

In yet another embodiment once the irreversible catalyst killer has been introduced into the reactor a period of time of about 5 minutes to about 24 hours, preferably about 1 hour to about 12 hours, more preferably about 1 hour to 6 hours and most preferably about 1 hour to 2 hours passes before continuing the transitioning process. Again, the duration of exposure is for the same reasons stated for the reversible catalyst killer.

Step (b2)

Typically, in the process of the invention it is important to substantially free the reactor of impurities, particularly the irreversible catalyst killer, which can render the second catalyst inactive upon its introduction into a reactor. Thus, in some embodiments, an organometallic compound may be introduced into the reactor which is capable of reacting with the irreversible catalyst killer.

This step is described in detail in European patent application 14199685.0 as step (b2) at p. 28, l.35-p. 29, l.24.

Step (b3)

During the polymerization with the first incompatible catalyst, gases accumulate within the reactor, which originate from the electron donor when the first catalyst is especially a Ziegler-Natta catalyst. These gases are typically poisonous to the first catalyst, particularly to the second incompatible catalyst. These gases for a traditional Ziegler-Natta catalyst include, for example, tetrahydrofuran (THF), ethanol, ethyl benzoate and the like. Also, the introduction of the reversible and irreversible catalyst killers also produce by-products that can be detrimental to any polymerization process.

Thus, before introducing the second incompatible catalyst the reactor contents are subjected to what is known in the art as pressure purging. Typically the procedure is used in handling any air/moisture sensitive materials to remove, purge, or reduce in the process of the invention, for example, the catalyst killers and by-products thereof and reactants to a lower level. This step is described in detail in European patent application 14199685.0 as step (b3) at p. 29, l.26-p. 30, l.32.

Step (b4)

Preferably, after step (b3) and before step (c), a continuity aid agent is introduced. This step is described in detail in European patent application 14199685.0 as step (b4) at p. 30, l.34-p. 31, l.24.

Step (c)

In step (c), a second catalyst killer is introduced to the catalyst feeding system to substantially (preferably completely) deactivate the first catalyst in the catalyst feeding system.

Examples of the suitable second catalyst killer are the same as the catalyst killers described in relation to the first catalyst killer used in step (b). The descriptions of the examples of the first catalyst are herein understood to be made also for the second catalyst.

The second catalyst killer may be the same as or different from the first catalyst killer.

As the second catalyst killer, a reversible catalyst killer and/or an irreversible catalyst killer may be used.

Preferably, the second catalyst killer is air, moist nitrogen (up to 5 wt % water in nitrogen), $CO_2$, or CO, more preferably air or moist nitrogen.

The amount of the second catalyst killer used in the catalyst feeding system is in principle not limited to any specific range. Since the catalyst feeding system is not coupled to any recovery system or the reactor during the introduction of second catalyst killer into the catalyst feeding system, the second catalyst killer will not end up in the reactor if the catalyst feeding system is purged sufficiently after the killing of the catalyst in the catalyst feeding system.

Preferably, however, the amount of the catalyst killer used in step (c) is adjusted to be sufficient but which would allow for a shorter purging time. The amount of the catalyst killer used in step (c) may be the amounts described above in relation to step (b).

Step (c1)

After stopping the introduction of the second catalyst killer, the catalyst feeding system is made substantially free of the second catalyst killer before the second catalyst is introduced. Accordingly, the catalyst feeding system is purged with an inert gas, preferably nitrogen.

Step (c2)

Preferably, the process of the invention further comprises the step of introducing the second catalyst to the catalyst feeding system to remove any remaining second catalyst killer by the reaction of the second catalyst and the second catalyst killer and subsequently emptying the catalyst feeding system of the second catalyst killer.

This step is also called in the art as 'priming' and ensures that the catalyst feeding system is free of the second catalyst killer which deactivates the second catalyst for use during the second polymerization reaction.

Step (d)

Subsequently, the catalyst feeding system is charged with the second catalyst.

Step (e)

Subsequently, the second catalyst is introduced into the reactor from the catalyst feeding system under reactive conditions. The second polymerization reaction is started.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

The polymerizations are performed in a continuous gas phase fluidized bed reactor having an internal diameter of 45 cm and a reaction zone height of 140 cm. The bed of polymer particles in the reaction zone is kept in a fluidized state by a recycle stream that works as a fluidizing medium as well as a heat dissipating agent for absorbing the exothermal heat generated within reaction zone. The reactor is kept at a constant temperature of about 87° C. and at a constant pressure of about 21.7 bar. Ethylene and hexene are used as the raw materials for polymerization. These materials form a make-up stream.

The metallocene catalyst composition contains biphenyl (2-indenyl)$_2$ZrCl$_2$ as the catalyst component.

The Ziegler Natta catalyst used is described below.

The solid catalyst composition is injected from a catalyst feeding system directly in the reaction zone of the fluidized bed using purified nitrogen as a carrier gas. The injection rate is adjusted to maintain a constant production rate of about 12 kg/hr. The produced polymer is discharged from the reaction zone semi-continuously via a series of valves into a fixed volume chamber. The so obtained product is purged to remove any volatile hydrocarbons and is then treated with humidified nitrogen to deactivate any trace quantities of residual catalyst composition. The properties of the polymer are determined by the following test methods:

TABLE 1

| | |
|---|---|
| Melt Index | ASTM D-1238 - Condition E (190° C., 2.16 kg) |
| Density | ASTM D-1505 |
| Bulk Density | The resin is poured in a fixed volume cylinder of 400 cc. The bulk density is measured as the weight of resin divided by 400 cc to give a value in g/cc. |
| Average Particle Size | The particle size is measured by determining the weight of material collected on a series of U.S. Standard sieves and determining the weight average particle size based on the sieve series used. |
| Fines | The fines are defined as the percentage of the total distribution passing through a 120 mesh standard sieve. This has a particle size equivalent of 120 microns. |

A transition is made in the catalyst feeding system from a polymerization using a
Ziegler-Natta catalyst to a metallocene catalyst.

The Ziegler-Natta catalyst is prepared by impregnating a titanium chloride, magnesium chloride, and tetrahydrofuran (THF) complex into silica support from a solution of THF. The silica is first dehydrated at 600° C. to remove water and chemically treated with tri-ethyl aluminum to further remove the remaining water. The catalyst is treated by adding tri-n-hexylaluminum (TNHAL) and di-ethylaluminum chloride (DEAC) in isopentane solution and dried to become the final Ziegler-Natta catalyst. The final catalyst has a titanium content of 1% and DEAC/THF mole ratio of 0.42 and TNHAL/THF ratio of 0.28.

The metallocene catalyst to be used in the examples below is made as follows:

Example 1

Large Scale Preparation of the Catalyst Composition of the Invention

At room temperature, 0.595 kg of diphenyl(2-indenyl)$_2$ ZrCl$_2$ is added to 36.968 kg of a 30% methylaluminoxane solution (Al content 13.58wt %) and stirred for 30 minutes to form activated metallocene. About 172 kg of dry toluene was added to 43 kg of silica 955 to form a silica slurry. At about 30° C., the activated metallocene was added to the silica slurry under agitation. After the activated metallocene was added, the temperature was increased to 50° C. After 2 hours at 50° C., all of modifier F (Table 5) was added. After addition the mixture was kept at 50° C. for 1 hour. The reaction temperature was then reduced to 30° C. The toluene was removed by filtration and the obtained catalysts composition was dried by raising the temperature to 55° C. and using a flow of warm nitrogen. The Al/Zr ratio used in this experiment was approximately 150.

TABLE 5

| | |
|---|---|
| Modifier F | At room temperature, add slowly 0.114 kg of neat triisobutylaluminum to a solution of 0.057 kg of cyclohexylamine in 9.7 kg of dry toluene. |

The catalyst composition obtained had an excellent flow as judged visually.
Reference Experiment 1
The plant reactor was charged with 45 kilograms of a "seed bed" of a linear low density polyethylene having a melt index of 1.0 and density of 918 kg/m³ produced earlier in another reactor through copolymerizing ethylene and hexene-1 using the metallocene catalyst.

The polymerization was started by feeding TIBAL-Amine about an hour earlier than the metallocene catalyst feeding at 0.12 kg/h feed rate at reactor temperature of 85° C., ethylene partial pressure of 8.5 bar, and C6/C2 of 0.115.

The development of density and melt index (MI) over time showed a typical stability as continuously produced from the pilot plant reactor and analyzed every two hours. The density of produced resin was about 918 kg/m3 and the melt index was about 1.0.

The above catalyst under the above process conditions produced the desired product with a gel content (total defect area) of less than 40 ppm according to the following method:
Method
A film was made by an extruder and the film was inspected with a detector from Optical Control Systems GmbH (OCS). The OCS equipment measures the defects.

The equipment used consisted of an Optical Control Systems GmbH (OCS) Model ME-20 extruder, and OCS Model CR-8 cast film system, and an OCS Model FSA-100 gel counter. The ME-20 extruder consists of a ¾" standard screw with 3/1 compression ratio, and 25/1 L/D. It includes a feed zone, a compression zone, and a metering zone. The extruder utilizes all solid state controls, a variable frequency AC drive for the screw, 5 heating zones including 3 for the barrel, 1 for the melt temperature and pressure measurement zone, and one for the die. The die was a 150 mm fixed lip die of a "fishtail" design, with a die gap of about 5 mm.

The total defect area (TDA) of the film is defined as:
TDA (ppm)=Total Defect Area (mm²)/Inspected Area (m²)

The gel size (μm) is classified in
0-300
300-600
600-1000
1000-1200
>1200

It can therefore be concluded that a satisfactory copolymer can be obtained by copolymerizing using the metallocene catalyst.
Reference Experiment 2
After reference experiment 1, the catalyst feeder was disconnected from reactor and charged with the Ziegler-Natta catalyst for contaminating the catalyst feeder with the Ziegler-Natta catalyst, followed by dumping and intensive purging with nitrogen.

Nitrogen purging was done continuously for about three hours. Once purging was done, priming with a metallocene catalyst was done through charging 150 g of the catalyst to the catalyst feeder followed by intensive mixing inside the catalyst reservoir or tank; a non-rotating component adjacent to the metering disc.

After an hour of mixing, the metallocene catalyst used for priming was dumped to flush the whole feeder system that comprises a metering disc; a surface of contact between the metering disc and the non-rotating component, a drive shaft, a pickup section; and an injection tube.

Once this was done, intensive purging of the catalyst feeder via purified nitrogen was done aiming at removing any remaining "contaminated" metallocene catalyst. The above procedure of catalyst feeder's priming and purging was repeated three times using the metallocene catalyst. Subsequently, 300 g of the metallocene catalyst was charged to the catalyst feeder.

The reactor and the catalyst feeding system were connected and metallocene catalyst was introduced to the reactor. The reactor picked up immediately within four hours of polymerization. No sudden increase in production rate was observed nor any change in the measured density or melt index.

Since there was no free THF in the reactor from a previous polymerization using Ziegler-Natta catalyst, there was no effect on the progression of resin properties of melt index and density.

The gel content (TDA) of the on-spec powder in terms of measured density and melt index were analyzed and found to be extremely excessive exceeding an average of 20,000 ppm.

Such excessive gel amount was not expected because the reactor did not have any Ziegler-Natta catalyst introduced to it and the catalyst feeding system was intensively purged and primed with metallocene catalyst after introducing the Ziegler-Natta catalyst to only the catalyst feeding system.
Reference Experiment 3
After reference experiment 2, further priming and flushing with the metallocene catalyst was done in the same way as in reference experiment 2. Subsequently the catalyst feeder was charged with 320 g of the metallocene catalyst.

Expectedly, the reactor picked up immediately within two hours of polymerization without any change in the measured density or melt index from reference experiment 1.

Since there was no free THF in the reactor from a previous polymerization using Ziegler-Natta catalyst, there was no effect on the progression of resin properties of melt index and density.

Still, the gel content (TDA) of the on-spec powder in terms of measured density and melt index were analyzed and found to be extremely excessive exceeding an average of 10,500 ppm.

Such excessive gel amount was not expected because the reactor did not have any Ziegler-Natta catalyst introduced to it and the catalyst feeding system was intensively purged and primed with metallocene catalyst after introducing the Ziegler-Natta catalyst introduced to the catalyst feeding system only.

Most of the observed gels were very high-molecular-weight gels. The reactor was opened, cleaned, and seedbed was replaced.

Experiment 4

The same procedure of charging the reactor with resin produced earlier from a metallocene catalyst and feeding of TIBAL-Amine is followed as in reference experiment 1 under same start-up conditions.

The development of density and melt index (MI) over time at an average T=87° C., and C6/C2=0.115 shows a typical stability as continuously produced from the pilot plant reactor and is analyzed every two hours. The density is about 918 kg/m3 and the melt index is about 1.0.

The above catalyst under the above process conditions produces the desired product with a gel content (total defect area) of less than 40 ppm. After at least 5 bed turn-overs, when the catalyst feeding system was disconnected from the reactor.

Then, the metallocene catalyst is dumped from the catalyst feeding system. The Ziegler-Natta catalyst, which is incompatible with the metallocene catalyst mentioned herein, is introduced to the catalyst feeding system for contamination purposes. The Ziegler-Natta catalyst is also dumped from the catalyst feeding system.

Subsequently, 5.0 wt % of water in nitrogen carrier is introduced to the catalyst feeding system under flow purge for less than an hour. Afterwards, the catalyst feeder is purged with pure nitrogen for less than half an hour. Once purging was done, priming with a metallocene catalyst, which is incompatible with the conventional Ziegler-Natta catalyst mentioned herein, is done through charging 150 g of the metallocene catalyst to the catalyst feeder followed by intensive mixing (priming) inside the catalyst reservoir or tank; a non-rotating component adjacent to the metering disc.

After less than an hour of mixing, the "deactivated" metallocene catalyst used for priming is dumped to flush the whole feeder system that comprises a metering disc; a surface of contact between the metering disc and the non-rotating component, a drive shaft, a pickup section; and an injection tube. Subsequently, 250 g of the metallocene catalyst is charged to the catalyst feeder and the catalyst feeding system is again connected to the reactor.

Again, the above catalyst under the above process conditions produces the desired product with a gel content (total defect area) of continuously less than 40 ppm.

This indicates that the residual Ziegler-Natta catalyst is deactivated by the humidified nitrogen in the catalyst feeder before the metallocene catalyst is charged, otherwise the polyolefin produced would have generated a significant amount of gels as experienced in reference experiments 2 and 3.

From the above experiments experiments 2-4, it can be concluded that this problem can be solved by using a catalyst killer to deactivate residual Ziegler-Natta catalyst in the catalyst feeding system before charging of metallocene catalyst and introducing metallocene catalyst to reactor.

The invention claimed is:

1. A process for transitioning from a first continuous polymerization reaction, in a reactor, conducted in the presence of a first catalyst to a second continuous polymerization reaction in the reactor conducted in the presence of a second catalyst, wherein the first and second catalysts are incompatible, the process comprising:
   (a) discontinuing the introduction of the first catalyst from a catalyst feeding system into a reactor and emptying the catalyst feeding system of the first catalyst;
   (b) introducing a first catalyst killer to the reactor to substantially deactivate the first catalyst in the reactor;
   (c) introducing a second catalyst killer to the catalyst feeding system to substantially deactivate the first catalyst in the catalyst feeding system;
   (c2) introducing a first portion of a second catalyst to the catalyst feeding system to remove any remaining second catalyst killer by the reaction of the second catalyst and the second catalyst killer;
   (c3) removing a reaction product from the reaction of the second catalyst with the second catalyst killer from the catalyst feeding system;
   (d) introducing a second portion of the second catalyst to the catalyst feeding system and
   (e) introducing the second catalyst to the reactor from the catalyst feeding system,
   wherein the second catalyst killer is the same as or different from the first catalyst killer.

2. The process according to claim 1, wherein the first catalyst is a Ziegler-Natta catalyst and the second catalyst is a metallocene catalyst or wherein the first catalyst is a chromium catalyst and the second catalyst is a metallocene catalyst.

3. The process according to claim 1, wherein the second catalyst is a metallocene catalyst selected from the group consisting of: [ortho-bis(4-phenyl-2-indenyl)-benzene]zirconium dichloride, [ortho-bis(5-phenyl-2-indenyl)-benzene] zirconium dichloride, [ortho-bis(2-indenyl)benzene]zirconium dichloride, [ortho-bis(2-indenyl)benzene]hafnium dichloride, [ortho-bis(1-methyl-2-indenyl)-benzene]zirconium dichloride, [2.2'-(1.2-phenyldiyl)-1.1'-dimethylsilyl-bis(indene)]zirconiumdichloride, [2,2'-(1,2-phenyldiyl)-1, 1'-diphenylsilyl-bis(indene)]zirconium dichloride, [2,2'-(1.2-phenyldiyl)-1.1 '-(1.2-ethanediyl)-bis(indene)]zirconium dichloride, [2.2'-bis(2-indenyl)biphenyl]zirconium dichloride and [2,2'-bis(2-indenyl)biphenyl]hafnium dichloride.

4. The process according to claim 1, wherein the first catalyst is a chromium catalyst.

5. The process according to claim 1, wherein the first catalyst is a Ziegler-Natta catalyst made by a process comprising:
   i. contacting a dehydrated support having hydroxyl groups with a magnesium compound having the general formula $MgR^1R^2$, wherein $R^1$ and $R^2$ are the same or different and are independently selected from the group consisting of an alkyl group, alkenyl group, alkadienyl group, aryl group, alkaryl group, alkenylaryl group and alkadienylaryl group;
   ii. contacting the product obtained in step (i) with modifying compounds (I), (II) and (III), wherein:
   (I) is at least one compound selected from the group consisting of carboxylic acid, carboxylic acid ester, ketone, acyl halide, aldehyde and alcohol;
   (II) is a compound having the general formula $R^{11}_f(R^{12}O)_g SiX_h$, wherein f, g and h are each integers from 0 to 4 and the sum of f, g and h is equal to 4 with a proviso that when h is equal to 4 then modifying compound (I) is not an alcohol, Si is a silicon atom, O is an oxygen atom, X is a halide atom and $R^{11}$ and $R^{12}$ are the same or different and are independently selected from the group comprising an alkyl group, alkenyl group, alkadienyl group, aryl group, alkaryl group, alkenylaryl group and alkadienylaryl group;
   (III) is a compound having the general formula $(R^{13}O)_4M$, wherein M is a titanium atom, a zirconium atom or a vanadium atom, O is an oxygen atom and $R^{13}$ is selected from the group comprising an alkyl group, alkenyl group, alkadienyl group, aryl group, alkaryl group, alkenylaryl group and alkadienylaryl group; and iii. contacting the product obtained in step (ii) with a titanium halide compound having the general formula $TiX_4$, wherein Ti is a titanium atom and X is a halide atom.

6. The process according to claim 1, wherein the second catalyst killer is an irreversible catalyst killer.

7. The process according to claim 1, wherein the second catalyst killer is a reversible catalyst killer.

8. The process according to claim 1, further comprising the following step between steps (c) and (c2):
(c1) purging the catalyst feeding system with an inert gas to remove at least a portion of the second catalyst killer.

9. The process according to claim 1, wherein the first polymerization reaction and/or the second polymerization reaction is conducted in a fluidized bed reactor.

10. The process according to claim 1, wherein the first polymerization reaction and/or the second polymerization reaction is a continuous polymerization of one or more α-olefin monomers of which at least one is ethylene or propylene.

11. The process according to claim 1, wherein the first polymerization and/or the second polymerization produces a polyethylene; or a polypropylene homopolymer or a propylene random copolymer.

12. A process for transitioning from a first continuous polymerization reaction, in a reactor, conducted in the presence of a first catalyst to a second continuous polymerization reaction in the reactor conducted in the presence of a second catalyst, wherein the first and second catalysts are incompatible, the process comprising:
(a) discontinuing the introduction of the first catalyst from a catalyst feeding system into a reactor and emptying the catalyst feeding system of the first catalyst;
(b) introducing a first catalyst killer to the reactor to substantially deactivate the first catalyst in the reactor;
(c) introducing a second catalyst killer to the catalyst feeding system to substantially deactivate the first catalyst in the catalyst feeding system;
(d) introducing a second catalyst to the catalyst feeding system and
(e) introducing the second catalyst to the reactor from the catalyst feeding system,
wherein the second catalyst killer is the same as or different from the first catalyst killer, and
wherein the first catalyst is a chromium catalyst supported on silica.

13. The process according to claim 12, wherein the second catalyst is a metallocene catalyst.

14. The process according to claim 12, wherein the second catalyst is a metallocene catalyst selected from the group consisting of: [ortho-bis(4-phenyl-2-indenyl)-benzene]zirconium dichloride, [ortho-bis(5-phenyl-2-indenyl)-benzene]zirconium dichloride, [ortho-bis(2-indenyl)benzene]zirconium dichloride, [ortho-bis(2-indenyl)benzene]hafnium dichloride, [ortho-bis(1-methyl-2-indenyl)-benzene]zirconium dichloride, [2.2'-(1.2-phenyldiyl)-1.1'-dimethylsilyl-bis(indene)]zirconiumdichloride, [2,2'-(1,2-phenyldiyl)-1,1'-diphenylsilyl-bis(indene)]zirconium dichloride, [2,2'-(1.2-phenyldiyl)-1.1'-(1.2-ethanediyl)-bis(indene)]zirconium dichloride, [2.2'-bis(2-indenyl)biphenyl]zirconium dichloride, and [2,2'-bis(2-indenyl)biphenyl] hafnium dichloride.

15. The process according to claim 12, wherein the second catalyst killer is an irreversible catalyst killer.

16. The process according to claim 12, wherein the second catalyst killer is a reversible catalyst killer.

17. The process according to claim 12, further comprising the following step between steps (c) and (d):
(c1) purging the catalyst feeding system with an inert gas to remove the second catalyst killer.

18. The process according to claim 12, wherein the first polymerization reaction and/or the second polymerization reaction is conducted in a fluidized bed reactor.

19. The process according to claim 12, wherein the first polymerization reaction and/or the second polymerization reaction is a continuous polymerization of one or more α-olefin monomers of which at least one is ethylene or propylene.

20. The process according to claim 12, wherein the first polymerization and/or the second polymerization produces a polyethylene; or a polypropylene homopolymer or a propylene random copolymer.

* * * * *